(No Model.)
J. F. HARRISON.
COMBINED GUANO DISTRIBUTER AND SEED PLANTER.
No. 325,535. Patented Sept. 1, 1885.
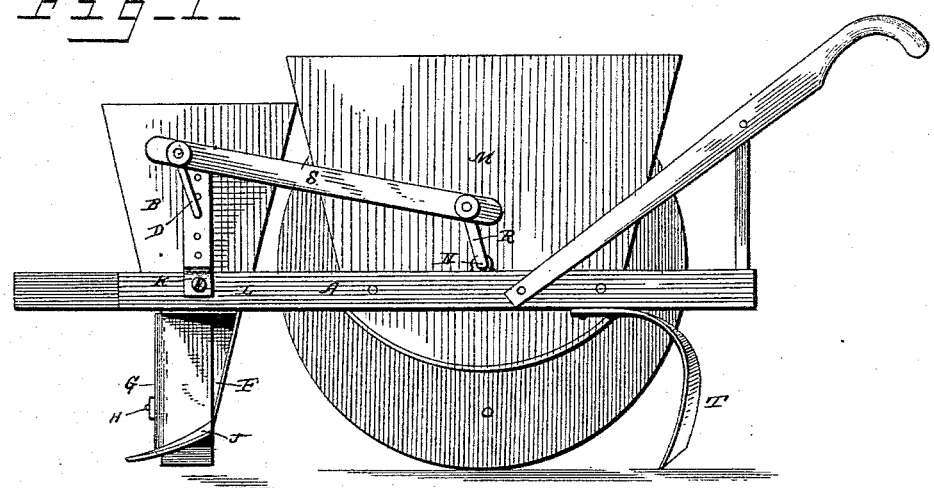
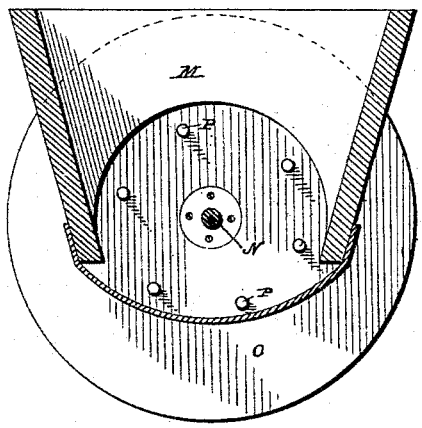
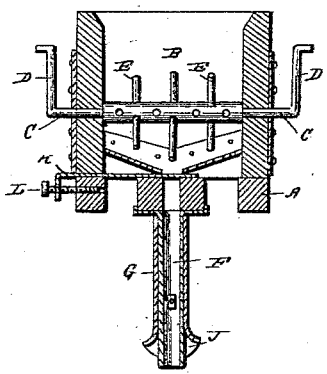
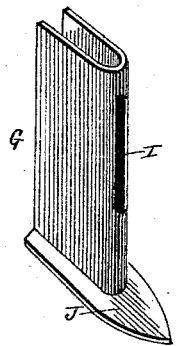
WITNESSES
Edwin T. Yewell,
Chas. D. Davis
INVENTOR
J. F. Harrison.
By C. M. Alexander
Attorney

United States Patent Office.

JAMES F. HARRISON, OF HOLLONVILLE, GEORGIA.

COMBINED GUANO-DISTRIBUTER AND SEED-PLANTER.

SPECIFICATION forming part of Letters Patent No. 325,535, dated September 1, 1885.

Application filed June 8, 1885. (No model.)

*To all whom it may concern:*

Be it known, that I, JAMES F. HARRISON, a citizen of the United States, residing at Hollonville, in the county of Pike and State of Georgia, have invented certain new and useful Improvements in a Combined Guano-Distributer and Seed-Planter, of which the following is a specification, reference being had therein to the accompanying drawings, in which—

Figure 1 represents a side elevation of my machine; Fig. 2, a vertical transverse sectional view of the seed-hopper; Fig. 3, a vertical transverse sectional view of the fertilizer hopper or distributer, and Fig. 4 a detail of the opener.

My invention consists in combining in one machine a fertilizer-distributer and cotton-seed planter, and is designed to produce a device whereby the fertilizer will be first distributed in the furrow, the cotton-seed deposited on top of the fertilizer, and the whole finally covered, as will be more fully hereinafter described, and particularly pointed out in the claim.

In the drawings, A indicates a rectangular frame, on the forward end of which is located the fertilizer-hopper B, provided with a bottom inclining toward an opening in the center of the same. The shaft C passes through the hopper B, and is extended out on each side thereof to form cranks D.

Stirrers E, secured in a drum or enlargement on the shaft C, serve to agitate the fertilizer and force the same through the opening in the bottom of the hopper.

Immediately beneath the opening in the hopper and a slot in the frame is secured a fertilizer spout or drill, F, which extends down into the earth (when in operation) to form the furrow.

Fitting over the front of the spout is a U-shaped opener, G. This opener is made adjustable on the spout, by means of the set-screw H and slot I, for the purpose of regulating the depth of the furrow, and at its lower end is provided with a flange, J, extending in front and on each side of the same, the flange on each side being upwardly inclined.

Beneath the opening in the hopper, resting on the frame and extending out on one side thereof, is a slide, K, adjustable, by means of the thumb-screw L, to regulate the discharge of the fertilizer. To the rear of the fertilizer-hopper B is the cotton-seed hopper M. On the shaft N, that passes through this hopper, is adjustably secured the drive-wheel O, provided on the side next to the hopper with stirring-pins P. These pins project into the hopper through an opening in the side thereof, and force the seed through the space between the wheel and the bottom of the hopper.

The shaft N is provided with cranks R, which are connected, by means of the rods S on each side of the machine, to the cranks on the shaft C of the fertilizer-hopper.

On the under side of the frame, and to the rear of the seed-hopper, is secured the coverers T.

The machine is provided with the usual handles.

What I claim, and desire to secure by Letters Patent, is—

A combined seed and fertilizer distributer, consisting of a suitable frame, a wheel mounted on a shaft, with crank-continuations, and having projecting pins on one side, a seed-hopper with a side opening for the reception of said pins, a fertilizer-hopper, a contained stirrer with a shaft having crank-continuations, rods connecting the cranks on the wheel-shaft and the stirrer-shaft, and a drill under the fertilizer-hopper, substantially as and for the purpose specified.

In testimony whereof I affix my signature in presence of two witnesses.

JAMES F. HARRISON.

Witnesses:
   HARRY WELLS,
   W. I. IVERSON.